(No Model.)
E. GUION.
MEDICINE SPOON.
No. 358,197. Patented Feb. 22, 1887.
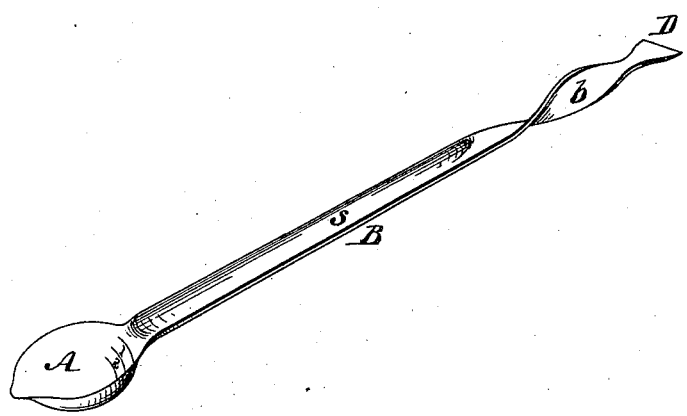
WITNESSES:
INVENTOR:
E. Guion
BY Munn & Co
ATTORNEYS.

UNITED STATES PATENT OFFICE.

ELISABETH GUION, OF NEW YORK, N. Y.

MEDICINE-SPOON.

SPECIFICATION forming part of Letters Patent No. 358,197, dated February 22, 1887.

Application filed July 30, 1886. Serial No. 209,534. (No model.)

*To all whom it may concern:*

Be it known that I, ELISABETH GUION, of the city, county, and State of New York, have invented new and useful Improvements in Medicine-Spoons, of which the following is a full, clear, and exact description.

This invention relates to medicine-spoons in which the bowl of the spoon is graduated to measure the quantity of medicine it is desired to deposit in it for a dose, in order that variable fixed quantities of medicine may be given as required.

The invention is more particularly applicable to spoons of this description used for administering medicines composed of powdered or granulated ingredients, but is not restricted thereto; and it consists in a novel construction of the spoon, whereby not only strength is combined with lightness and with facility of handling the spoon, but increased convenience is afforded for stirring as well as measuring and administering the medicine, and of cutting, scraping, or detaching it from the interior surfaces of the bottle or vessel from which the medicine is taken, substantially as hereinafter described, and pointed out in the claims.

Reference is to be had to the accompanying drawing, forming a part of this specification, in which the figure represents a view in perspective of a medicine-spoon embodying my invention.

The spoon is preferably made of metal and from one and the same piece. A is its graduated bowl at one end of the shank B, which latter is fluted throughout the greater portion of its length, being of concavo-convex construction on its front and back, whereby not only increased strength for a given quantity of metal is secured, but the flute $s$ on the top or front side of the shank, which opens into the rear end of the bowl, serves as a channel for conducting any medicine that gets onto the shank when dipping the spoon into the bowl of the spoon. The upper or back end portion of this fluted shank B is twisted to form a spiral, $b$, which not only makes a convenient handle for manipulating the spoon and still further assists in strengthening it, but gives an effective stirring surface when inserting the handle end of the spoon in the medicine within the bottle or vessel from which the supply is taken.

The extreme upper or back end of the shank or handle portion of the spoon is flattened out beyond the spiral, and is constructed to form a chisel-shaped scraper or cutter, D, in line with the shank for detaching any medicine that may adhere to the interior of the sides of the bottle or vessel containing the supply, and to assist in breaking up coagulated or lumpy masses and in stirring the medicine in said vessel to facilitate the measuring of it in the graduated bowl of the spoon from which the medicine is administered.

Having thus described my invention, what I claim as new, and desire to secure by Letters Patent, is—

1. A medicine spoon provided with a graduated bowl at one end of its shank and with a chisel-shaped scraper or cutter at its opposite end, substantially as and for the purposes specified.

2. The within-described medicine-spoon, consisting of the graduated bowl A, fluted shank B, and chisel-shaped scraper or cutter D at the opposite end of the shank to that occupied by the bowl, essentially as described.

ELISABETH GUION.

Witnesses:
EDGAR TATE,
WILLIAM D. KNUDSEN.